(12) United States Patent
Eshel et al.

(10) Patent No.: US 8,164,666 B2
(45) Date of Patent: Apr. 24, 2012

(54) DEVICE AND METHOD FOR PROVIDING A REFERENCE SIGNAL

(75) Inventors: Noam Eshel, Pardesiyya (IL); Zeituni Golan, Kfar Saba (IL)

(73) Assignee: Pixim Israel Ltd., Ra'anana, IL (US)

( * ) Notice: Subject to any disclaimer, the term of this patent is extended or adjusted under 35 U.S.C. 154(b) by 500 days.

(21) Appl. No.: 12/363,837

(22) Filed: Feb. 2, 2009

(65) Prior Publication Data

US 2010/0194953 A1     Aug. 5, 2010

(51) Int. Cl.
*H04N 3/14* (2006.01)
*H04N 5/335* (2011.01)
*H04N 5/217* (2011.01)

(52) U.S. Cl. ........................ 348/308; 348/241

(58) Field of Classification Search .................. 348/294, 348/308, 241, 229.1
See application file for complete search history.

(56) References Cited

U.S. PATENT DOCUMENTS

2005/0073351 A1*  4/2005  Ko et al. ........................ 327/337
* cited by examiner

*Primary Examiner* — Alicia M Harrington
(74) *Attorney, Agent, or Firm* — Reches Patents

(57) ABSTRACT

A device that includes a pixel array, an interfacing circuit and a sample and hold circuit. The interfacing circuit directs to at least one pixel of the pixel array a sampled voltage that is outputted from the sample and hold circuit. The sample and hold circuit includes an NMOS transistor, a bootstrap circuit, a capacitor, sample phase switches and hold phase switches. During the sample phase the source of the NMOS transistor receives the input voltage; the gate of the NMIS transistor receives, from the bootstrap circuit a gate voltage that exceeds a supply voltage and a capacitor of the sample and hold circuit is charged to the input voltage to provide the sampled voltage. During a hold phase the capacitor stores the sampled voltage; the gate, source and drain of the NMOS transistor are maintained at the same potential and the source of the NMOS transistor is disconnected from an input port through which the input voltage was provided.

8 Claims, 3 Drawing Sheets

DEVICE AND METHOD FOR PROVIDING A REFERENCE SIGNAL

FIELD OF THE INVENTION

The invention relates to methods for providing a reference signal.

BACKGROUND OF THE INVENTION

Digital cameras include a two-dimensional pixel arrays. A single pixel can include one or more photo-detectors as well as multiple transistors. Typical photo-detectors include photodiodes, phototransistors, photo-gates, hole accumulation diodes, pinned diodes, avalanche diodes, buried accumulation and transfer layer devices.

Various prior art pixels are known. The most commonly used pixels are either CCD pixels or CMOS pixels. Prior art CMOS pixels and two dimensional CMOS arrays are illustrated in the following U.S. patents which are incorporated herein by reference: U.S. Pat. No. 6,777,660 of Lee, U.S. Pat. No. 6,762,401 of Lee, U.S. Pat. No. 6,567,495 of Harada, U.S. Pat. No. 6,750,912 of Tennant et al., U.S. Pat. No. 6,697,111 of Kozlowski et al., U.S. Pat. No. 6,665,013 of Fossum et al., U.S. Pat. No. 6,587,142 of Kozlowski et al., U.S. Pat. No. 6,538,245 of Kozlowski, U.S. Pat. No. 6,532,040 of Kozlowski et al., U.S. Pat. No. 5,892,540 of Kozlowski et al., U.S. Pat. No. 5,238,276 of Dhuse et al., U.S. Pat. No. 6,326,230 of Pain et al., and European patent application EP1881692A2 titled "Methods for reading a pixel and for writing to a pixel and a device having pixel reading capabilities and pixel writing capabilities" which is incorporated herein by reference.

The pixels that form the pixel array are usually arranged in columns. Pixels that belong to the same pixel column may share various control and feedback signals.

The pixel columns are usually activated in a pipeline manner—while some pixel columns are reset other pixel columns are read ad yet other pixel columns undergo an integration phase. Typically, there is a relatively long time gap between the reset phase of a certain pixel column to a read phase of that pixel column.

Reference voltages are provided to pixels and to pixel readout circuits during the reset, read and integration phases. These reference voltages can affect the outcome of the reset and read phases, especially when applying correlated double sampling techniques.

Highly stable reference voltage sources are relatively expensive and their complexity can increase as a function of the number of pixel columns. Unstable reference voltage sources can output an unstable reference voltage that can vary between a reset phase of a pixel column to a read phase of that pixel column.

There is a need to provide efficient methods to provide reference signals to groups of pixels and to pixel readout circuits.

SUMMARY OF THE INVENTION

A method for providing a sampled voltage to pixels of a pixel array, the method includes: sampling an input voltage during a sampling phase to provide a sampled voltage, wherein the sampling includes: providing the input voltage to a source of an transistor; providing a gate circuit, from a bootstrap circuit, to a gate of the transistor; wherein the gate voltage exceeds a supply voltage; and allowing a capacitor that is coupled to a drain of the transistor to be charged to the input voltage to provide a sampled voltage; storing, during a hold phase, the sampled voltage and outputting the sampled voltage to multiple pixels of a pixel array; wherein the storing includes: keeping the gate, source and drain of the transistor at the same potential; and disconnecting the source of the transistor from an input port through which the input voltage was provided.

The method can include grounding a bulk of the NMOS transistor during the sampling phase; disconnecting the bulk of the NMOS transistor from the ground during the hold phase; and disconnecting the gate of the NMOS transistor from the bootstrap circuit during the hold phase.

The method can include sampling the input during a sampling phase that does not exceed 5 microseconds.

The sampling can include providing, by a buffer, an input voltage to a first input of the bootstrap circuit; providing to a second input of the bootstrap circuit a control signal that changes between phases of the sample period; and receiving from the bootstrap circuit a gate voltage that substantially equals the supply voltage plus the input voltage.

A device that includes a pixel array, an interfacing circuit and a sample and hold circuit; wherein the interfacing circuit directs to at least one pixel of the pixel array a sampled voltage that is outputted from the sample and hold circuit; wherein the sample and hold circuit includes an transistor, a bootstrap circuit, a capacitor, sample phase switches and hold phase switches; wherein during the sample phase the source of the transistor receives the input voltage; the gate of the transistor receives, from the bootstrap circuit a gate voltage that exceeds a supply voltage; and a capacitor of the sample and hold circuit is charged to the input voltage to provide the sampled voltage; wherein during a hold phase the capacitor stores the sampled voltage; the gate, source and drain of the transistor are maintained at the same potential; and the source of the transistor is disconnected from an input port through which the input voltage was provided.

The transistor can be an NMOS transistor.

The bulk of the NMOS transistor can be grounded during the sampling phase; wherein the bulk of the NMOS transistor is disconnected from the ground during the hold phase; and wherein the gate of the NMOS transistor is disconnected from the bootstrap circuit during the hold phase.

The sample and hold circuit can be configured to sample the input during a sampling phase that does not exceed 5 microseconds.

The NMOS transistor can have a high threshold voltage.

The sample and hold circuit can further include a buffer that is coupled between a first input of the bootstrap circuit and a source of the bootstrap circuit; wherein a second input of the bootstrap circuit receives a control signal that changes between phases of the sample period; and wherein the bootstrap circuit is configured to provide to the gate of the NMOS transistor a gate voltage that substantially equals the supply voltage plus the input voltage.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Pixels output analog signals and should be provided with accurate analog signals during their operation.

Low noise analog voltages can be provided by sample and hold circuits that sample signals during a quiet period during which digital noises and analog noises are low and hold the sampled signals by a low leakage switch. The sampled signals can be provided during noisy phases such as a readout phase of a group of pixel. Thus, despite power rail noises and especially despite power rail spikes—a quiet samples signal can be provided.

The analog signals that are sampled by the sample and hold circuits can be generated by analog circuits that are characterized by a long response period. These analog circuits overcome noises after a relatively long period. Hence—their outputs are sampled during quiet periods and the sampled (quiet) analog signal is outputted by the sample and hold circuits during noisy periods. A non limiting example of such analog circuits is pixel emulators. After the sampling the analog circuits can be connected to the ground.

The samples and hold circuit includes a low leakage switch and a capacitor. The low leakage switch includes an NMOS transistor and a bootstrap circuit that provides a voltage that is higher than the supply voltage in order to allow the NMOS transistor to output a high output voltage.

Figure 1:
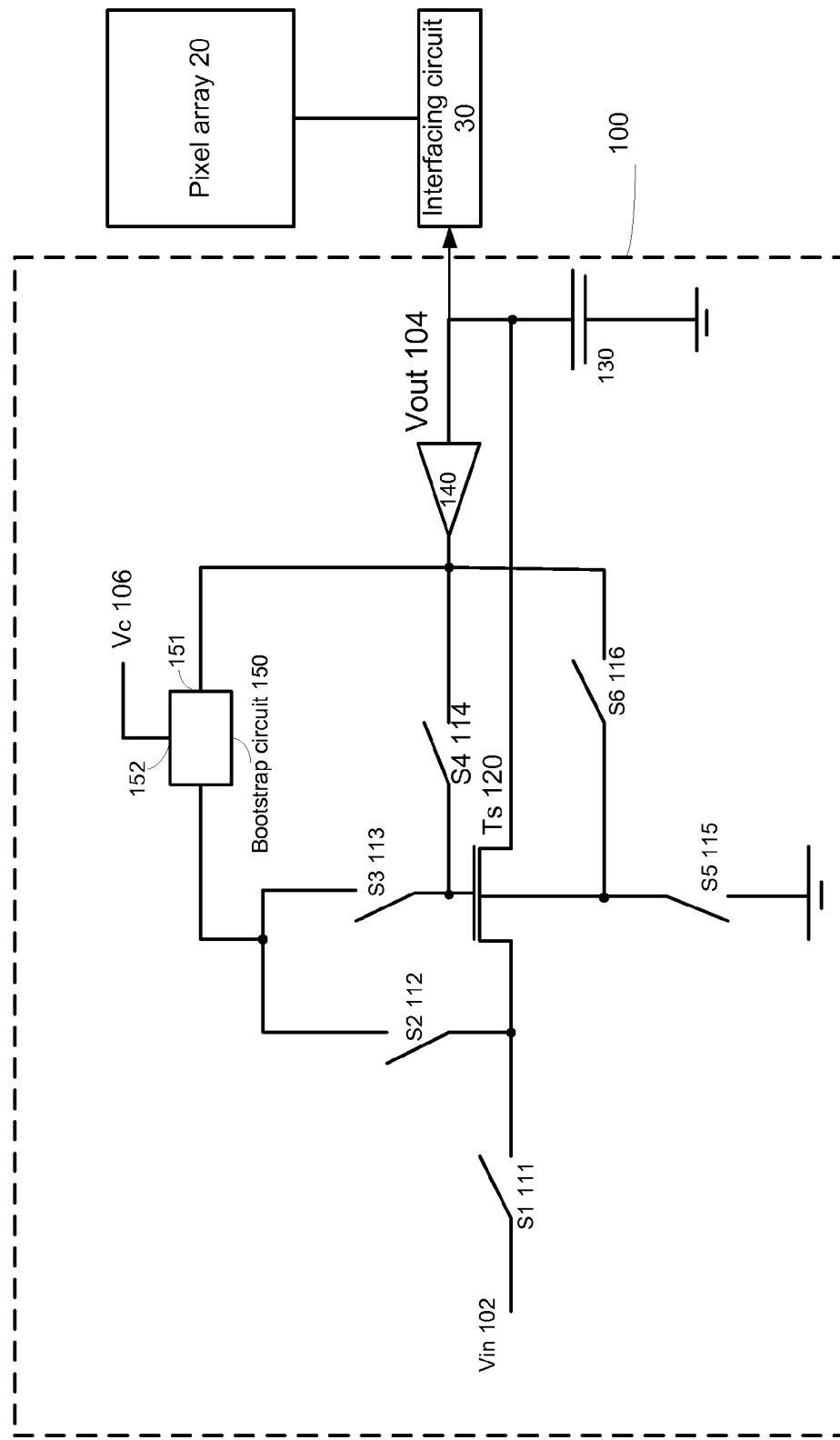
FIG. 1 illustrates a device according to various embodiments of the invention.

FIG. 1 illustrates a device 10 according to an embodiment of the invention.

Device 10 includes pixel array 20, interfacing circuit 30 and sample and hold circuit 100.

Interfacing circuit 30 can be a multiplexer but this is not necessarily so. Interfacing circuit 30 directs a sampled voltage to at least one pixel of the pixel array 20 from sample and hold circuit 100.

Sample and hold circuit 100 includes NMOS transistor 120, bootstrap circuit 150, capacitor 130, sample phase switches S1 111, S3 113, S5 115 and hold phase switches S2 112, S4 114 and S6 116.

Sample phase switches S1 111, S3 113, S5 115 are closed (provide connectivity between their ends) during the sample phase and are opened (disconnect their ends) during the hold phase. Hold phase switches S2 112, S4 114 and S6 116 are closed during the hold phase and are opened during the sample phase.

During the sample phase the source of NMOS transistor 120 receives the input voltage Vin 102, the gate of NMOS transistor 120 receives, from bootstrap circuit 150 a gate voltage Vg 104 that exceeds a supply voltage. Accordingly, capacitor 130 is charged to the input voltage (Vin 102) to provide the sampled voltage.

Input voltage Vin 102 can be provided by various sources such as but not limited to a pixel emulator that is characterized by a slow response. It emulates a pixel so that bias samples that control the pixels do not interfere with the operation of the pixel.

During the hold phase capacitor 130 stores the sampled voltage (Vin 102). The gate, source and drain of NMOS transistor 120 are maintained at the same potential and the source of NMOS transistor 120 is disconnected from an input port through which the input voltage was provided.

The bulk of NMOS transistor 120 can be grounded during the sampling phase and can be disconnected from the ground during the hold phase. The gate of NMOS transistor 120 can be disconnected (by opening S3 113) from bootstrap circuit 150 during the hold phase.

Sample and hold circuit 100 can be configured to sample the input during a sampling phase that does not exceed 5 microseconds.

NMOS transistor 120 can be of a high threshold voltage.

Sample and hold circuit 100 can also include buffer 140 that is connected between first input 151 of bootstrap circuit 150 and a drain of NMOS transistor 120. A second input 152 of bootstrap circuit 150 receives control signal Vc 106 that changes between phases of the sample period. Bootstrap circuit 150 can be configured to provide to the gate of NMOS transistor 120 a gate voltage Vg that substantially equals the supply voltage plus the input voltage. Vg=Vdd+Vin. This allows NMOS transistor 120 to output a high enough voltage signal and to overcome the inherent limitation of NMOS transistors in outputting high output voltages.

Figure 2:
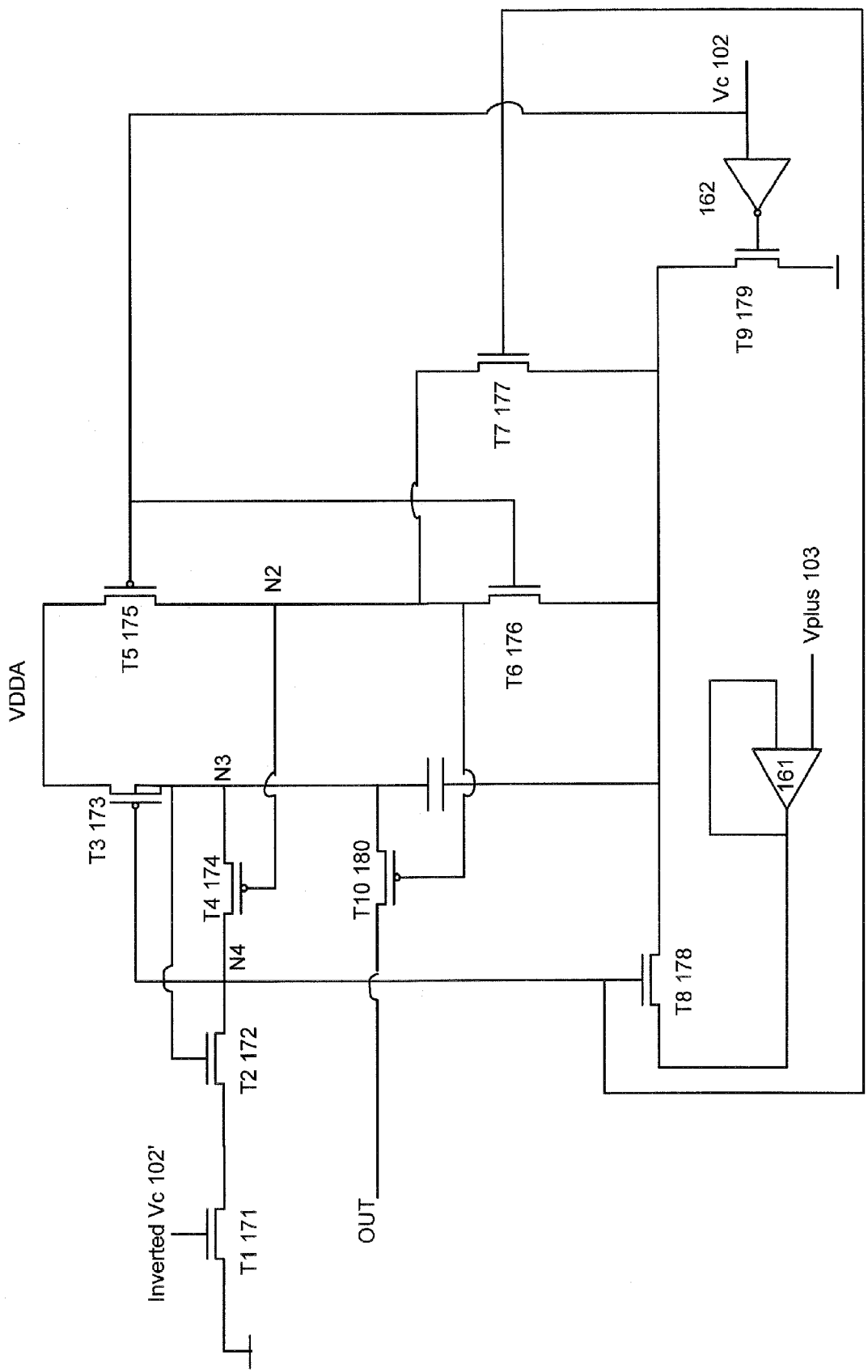
FIG. 2 illustrates a bootstrap circuit according to an embodiment of the invention.

FIG. 2 illustrates bootstrap circuit 150 according to an embodiment of the invention.

Second input 152 of bootstrap circuit 150 receives a control signal Vc 106 that is reset during a first phase of the sample period and is set during a second phase of the sample period.

During the sample period input 151 receives a voltage (referred to capacitor voltage) that raises from about zero to Vin 102—as capacitor 130 is being charged.

Bootstrap circuit 150 includes: first till tenth bootstrap transistors 171-180, capacitor 190, inverter 162 and buffer 161. First, third, fourth, fifth and tenth bootstrap transistors 171, 173, 174, 175 and 180 are PMOS transistors while the second, sixth, seventh, eighth and ninth bootstrap transistors 172, 176, 177, 178 and 179 are NMOS transistors. Buffer 161 receives at one of its inputs Vplus 103. Another input of buffer 161 is connected to the output of the buffer. The input of inverter 161 receives Vc 102 while the gate of first bootstrap transistor T1 171 receives an inverted voltage—"inverter Vc 102'".

The following table illustrates the connectivity of the various bootstrap transistors. S stands for source, G stands for gate, D stands for drain. GR stands for ground and E stands for an end (for example—an end of a capacitor), N stands for node, and O stands for output.

|    | S | D | G |
|----|---|---|---|
| T1 | D(T2) | GR | Inverted Vc |
| T2 | D(T4), G(T3), G(T8), G(T7), N4 | S(T1) | D(T3), E1(C), S(T4), S(T10) |
| T3 | VDDA | S(T4), E1(C), N3, S(T2), S(T10) | S(T2), D(T4), G(T8), G(T7), N4 |
| T4 | D(T3), E1(C), G(T2), S(T10) | G(T8), S(T2), N4 | D(T5), S(T6), S(T7), N2, G(T10) |
| T5 | VDDA | G(T4), S(T6), G(T10), S(T7), N2 | G(T6), Vc |
| T6 | S(T7), G(T10), D(T5), G(T4), N2 | D(T7), S(T9), D(T8), E2(C) | G(T5), Vc |
| T7 | S(T6), G(T10), D(T5) | D(T6), D(T9), D(T8), E2(C) | G(T3), D(T4), S(T2), G(T8), N4 |
| T8 | O(Buffer) | E2(C), S(T9), D(T9), D(T6), D(T7), E2(C), N1 | G(T3), D(T4), S(T2), G(T7), N2, G(T7) |
| T9 | GR | D(T8), D(T6), D(T7), E2(C) | Inverted Vc |
| T10 | E1(C), D(T3), S(T4), G(T2), N3 | Output port | G(T4), S(T6), S(T7), D(T5), N2 |

The output of buffer 161 is connected to the source of eighth bootstrap transistor 178 and to an input of buffer 161. Another input of buffer 161 receives capacitor voltage Vcap 103.

During an initialization stage (for example—when the circuit is power up) N3 is charged to VDDa as a result of a bulk leakage of T3 173.

Assuming the Vc 102 is set to zero. The gate of fifth bootstrap transistor T5 175 is grounded and the voltage of N2 is VDDA. The gate of second bootstrap transistor T2 172 is grounded and the voltage of gate of the first bootstrap transistor T1 171 is VDDA. Accordingly—the voltage of N4 is zero. This causes the gate of third bootstrap transistor T3 173 to be set to zero and the voltage of N3 to be set to VDDA. The gate of the ninth bootstrap transistor T9 179 is set to VDDA ("1") and this transistor (T9 179) grounds the second end (E2(C)) of capacitor C 190. The capacitor C 190 stores VDDA as V(E2(C))=0 and V(E1(C))=VDDA.

When Vc 102 is set to "1" the following changes occur: N2=0 and this causes the gate of tenth transistor T10 180 to be set to zero and causes the circuit to output a zero output signal (OUT=0). This also causes the gate of the fourth bootstrap transistor 174 to be set to zero and causes the voltage of N4 to be VDDA. Accordingly, the gate of the eighth transistor T8 178 is set to VDDA and T8 178 is opened so as to transfer Vplus 103 to its drain—this causes a change (from zero to Vplus 103) in the voltage of the second end of capacitor and this change causes the voltage of the first end of capacitor C 190 to increase from VDDA to VDDA+Vplus. This voltage is transferred through T10 180 to the output of the bootstrap circuit: OUT=VDDA+Vplus. OUT can be slightly lower than VDDA+Vplus but higher then VDDA—thus providing the bootstrap effect.

Figure 3:
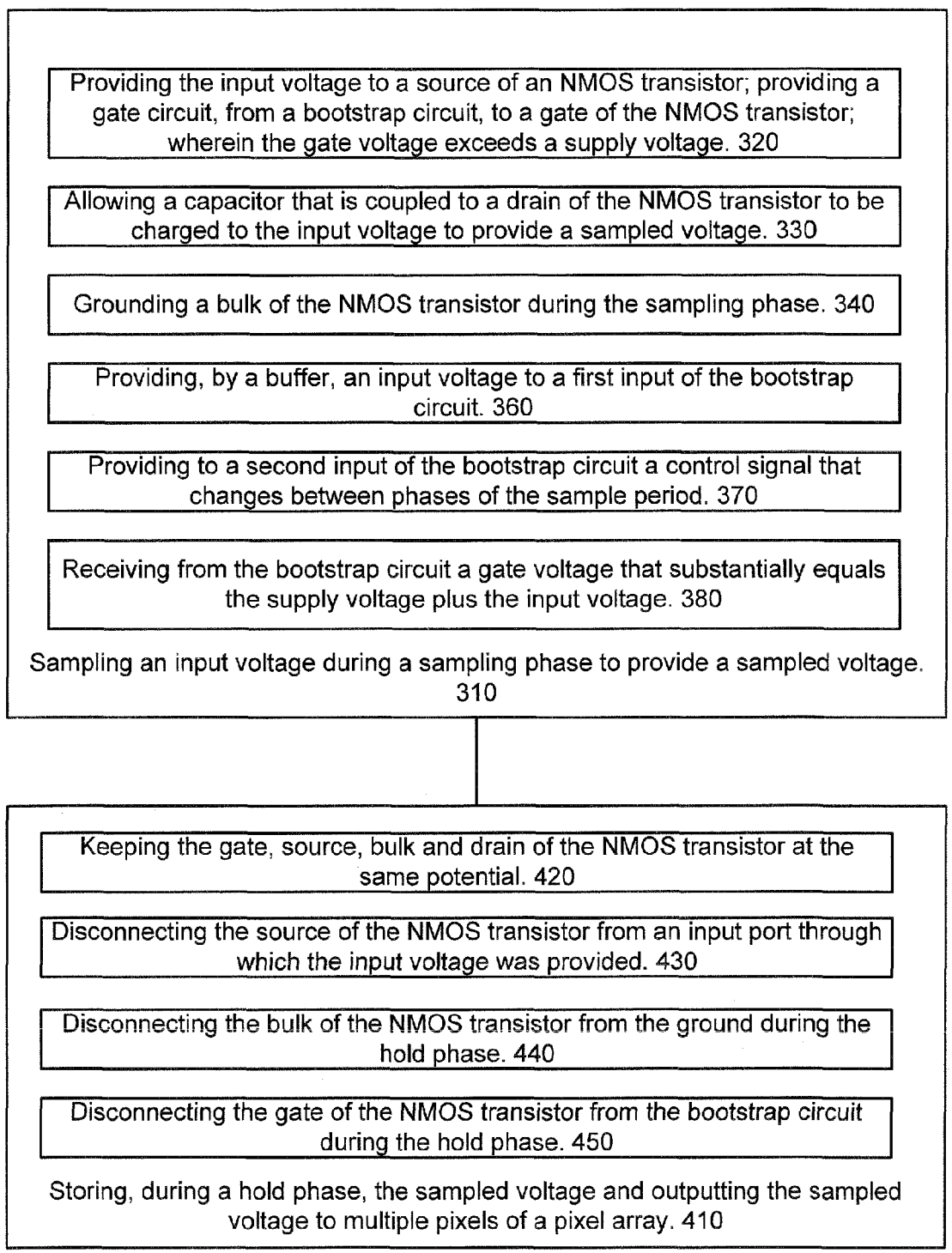
FIG. 3 illustrates a method for reading multiple groups of pixels, according to an embodiment of the invention.

FIG. 3 illustrates method 300 for reading multiple groups of pixels, according to an embodiment of the invention.

Method 300 starts by stage 310 of sampling an input voltage during a sampling phase to provide a sampled voltage.

Stage 310 includes stage 320 of providing the input voltage to a source of an NMOS transistor; providing a gate circuit, from a bootstrap circuit, to a gate of the NMOS transistor; wherein the gate voltage exceeds a supply voltage; and stage 330 of allowing a capacitor that is coupled to a drain of the NMOS transistor to be charged to the input voltage to provide a sampled voltage. The NMOS transistor can have a high threshold voltage.

Stage 310 is followed by stage 410 of storing, during a hold phase, the sampled voltage and outputting the sampled voltage to multiple pixels of a pixel array. Stage 410 includes stage 420 of keeping the gate, source and drain of the NMOS transistor at the same potential; and stage 430 of disconnecting the source of the NMOS transistor from an input port through which the input voltage was provided.

Stage 310 can also include stage 340 of grounding a bulk of the NMOS transistor during the sampling phase.

Stage 410 can include stage 430 of disconnecting the bulk of the NMOS transistor from the ground during the hold phase and stage 440 of disconnecting the gate of the NMOS transistor from the bootstrap circuit during the hold phase.

Stage 410 can include performing the sampling during a short period. For example—during a period that does not exceed 5 microseconds.

Stage 310 can also include stage 360 of providing, by a buffer, an input voltage to a first input of the bootstrap circuit, stage 370 of providing to a second input of the bootstrap circuit a control signal that changes between phases of the sample period; and stage 380 of receiving from the bootstrap circuit a gate voltage that substantially equals the supply voltage plus the input voltage.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps from those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method for providing a sampled voltage to pixels of a pixel array, the method comprising:
    sampling an input voltage during a sampling phase to provide a sampled voltage, wherein the sampling comprises:
        providing the input voltage to a source of an transistor;
        providing a gate circuit, from a bootstrap circuit, to a gate of the transistor; wherein the gate voltage exceeds a supply voltage; and allowing a capacitor that is coupled to a drain of the transistor to be charged to the input voltage to provide a sampled voltage;

storing, during a hold phase, the sampled voltage and outputting the sampled voltage to multiple pixels of a pixel array; wherein the storing comprises:

keeping the gate, source and drain of the transistor at the same potential; and disconnecting the source of the transistor from an input port through which the input voltage was provided;

wherein the transistor is an NMOS transistor;

wherein the method further comprises:

grounding a bulk of the NMOS transistor during the sampling phase;

disconnecting the bulk of the NMOS transistor from the ground during the hold phase; and disconnecting the gate of the NMOS transistor from the bootstrap circuit during the hold phase.

2. The method according to claim 1 comprising sampling the input during a sampling phase that does not exceed 5 microseconds.

3. The method according to claim 1 wherein the NMOS transistor has a high threshold voltage.

4. The method according to claim 1 wherein the sampling comprises:

providing, by a buffer, an input voltage to a first input of the bootstrap circuit;

providing to a second input of the bootstrap circuit a control signal that changes between phases of the sample period; and receiving from the bootstrap circuit a gate voltage that substantially equals the supply voltage plus the input voltage.

5. A device, comprising a pixel array, an interfacing circuit and a sample and hold circuit;

wherein the interfacing circuit directs to at least one pixel of the pixel array a sampled voltage that is outputted from the sample and hold circuit;

wherein the sample and hold circuit comprises an transistor, a bootstrap circuit, a capacitor, sample phase switches and hold phase switches;

wherein during the sample phase the source of the transistor receives the input voltage; the gate of the transistor receives, from the bootstrap circuit a gate voltage that exceeds a supply voltage; and a capacitor of the sample and hold circuit is charged to the input voltage to provide the sampled voltage;

wherein during a hold phase the capacitor stores the sampled voltage; the gate, source and drain of the transistor are maintained at the same potential; and the source of the transistor is disconnected from an input port through which the input voltage was provided;

wherein the transistor is an NMOS transistor;

wherein a bulk of the NMOS transistor is grounded during the sampling phase; wherein the bulk of the NMOS transistor is disconnected from the ground during the hold phase; and wherein the gate of the NMOS transistor is disconnected from the bootstrap circuit during the hold phase.

6. The device according to claim 5 wherein the sample and hold circuit is configured to sample the input during a sampling phase that does not exceed 5 microseconds.

7. The device according to claim 5 wherein the NMOS transistor has a high threshold voltage.

8. The device according to claim 5 wherein the sample and hold circuit further comprises a buffer that is coupled between a first input of the bootstrap circuit and a source of the bootstrap circuit; wherein a second input of the bootstrap circuit receives a control signal that changes between phases of the sample period; and wherein the bootstrap circuit is configured to provide to the gate of the NMOS transistor a gate voltage that substantially equals the supply voltage plus the input voltage.

* * * * *